April 19, 1927. R. MATTICE Re. 16,599

METHOD OF REPAIRING BROKEN METALLIC STRUCTURES

Original Filed Sept. 12, 1924

Inventor
Royal Mattice
By Donald U. Rich
Attorney

Reissued Apr. 19, 1927. Re. 16,599

UNITED STATES PATENT OFFICE.

ROYAL MATTICE, OF BETHLEHEM, PENNSYLVANIA.

METHOD OF REPAIRING BROKEN METALLIC STRUCTURES.

Original No. 1,592,609, dated July 13, 1926, Serial No. 737,816, filed September 12, 1924. Application for reissue filed January 26, 1927. Serial No. 163,811.

This invention relates to a method of repairing cracked, fractured or broken metallic structures by welding.

Heretofore cracked, fractured or broken structures have been repaired by forming a mechanical patch; bolts, cap screws or the like being employed, but this method presents many disadvantages in that an operator or repair man would often-times twist the heads off of the cap screws, strip the bolt threads or break the bolt, and sometimes the bolt would have a loose fit resulting in twisting thereof and precluding the tightening of the patch.

Further, it has been found that frequently insufficient space prohibited the use of bolts, cap screws or the like.

It is therefore one object of this invention to obtain a shrink fit in the repairing of cracked, fractured or broken metallic structures.

It is a further object of this invention to overcome the before mentioned disadvantages.

It is a still further object of this invention to secure a strong joint between plates or sheets in a quick efficient manner, whereby to repair cracked, fractured or broken metallic structures.

Another object of this invention is to provide a method of welding together plates or other metallic articles whereby to repair the same.

The invention is illustrated by way of example, in the accompanying drawings, in which.

Figure 3:
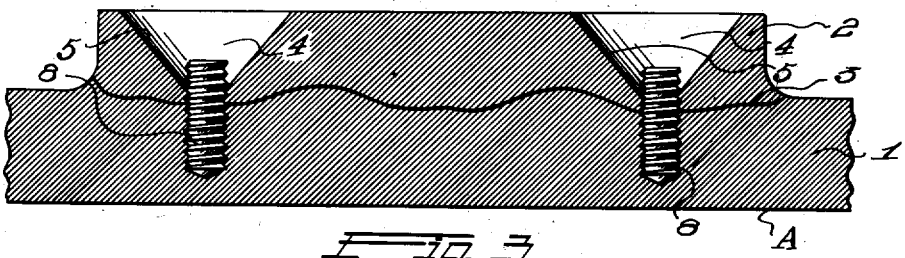
Fig. 3 is a cross sectional view through a broken metallic structure showing the second step in the method.

Referring now more particularly to the drawings, in which similar characters of reference designate similar parts in the several views, A designates a piece of metal of any structure which has a portion thereof broken, the two sections being designated as 1 and 2, while 3 indicates the line of break, which in the instance shown is of irregular contour.

As the first step in my method of repairing the broken structure, provided the sections 1 and 2 are complementary, I first drill or otherwise form a number of openings 4 in section 2, which openings are then countersunk as shown at 5; each countersink preferably extending to a depth about one quarter of an inch less than the thickness of section 2 at the place being drilled. This depth has been found satisfactory in practice, but of course, the depth of the countersink may vary in accordance with the particular "job"; and I do not limit this invention to any specific depth of countersink.

When the openings have been countersunk, the section 2 is placed in position against section 1, and held thereagainst in any suitable manner, whereupon openings 6 are drilled or otherwise formed, in section 1, which openings are aligned, obviously, with openings 4; section 2 serving as a masterplate or template.

The openings are then tapped or threaded as shown at 7, the template being removed if necessary, and then threaded studs 8 are secured within said openings, see Fig. 3.

The drawing illustrates the studs 8 as secured within the openings by being threaded therein; the studs thus being held within the openings in a mechanical manner. The studs are secured directly to the plate 1 in a mechanical manner in contradistinction to an arrangement whereby the studs may be held to or within a plate by added means, such for example, as the means shown in the British patent to the Quasi-Arc Company, No. 114,268 of 1918, in which patent the studs are secured to the plate by means of welding material; the studs thus being indirectly secured to the plate. By the use of the word "mechanically" I do not infer or mean that the studs are placed in position by mechanical apparatus, such for example, as a welding machine, but I mean that the studs in their secured position in the plate are retained mechanically in such secured position.

In practice it has been found advisable to provide studs of such length that they extend into section 2 at least one quarter of an inch beyond the lowest line of countersink. It has been found in practice, also, that ductile studs are highly satisfactory but obviously, substantially non-ductile studs may be used within the spirit and scope of the invention.

Figure 4:
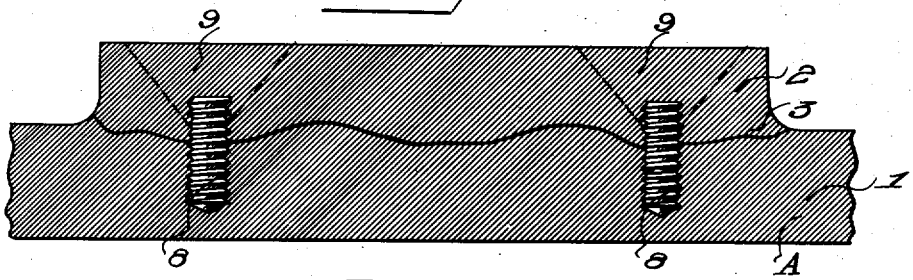
Fig. 4 is a cross sectional view through a broken metallic structure showing the final step in the method.
Figure 2:
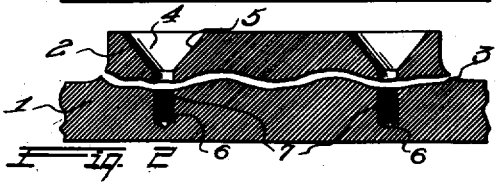
Fig. 2 is a cross sectional view through a broken metallic structure, showing the first step in the method.

Plates 1 and 2 being in the position shown in Fig. 2 with studs 8 in place, I now weld the studs 8 to plate or section 2, and the welding is continued until the entire countersink is filled as shown in Fig. 4 at 9. It will be noted that in reality a head 9 has been formed on stud 8, the head becoming an integral part of section 2 and stud 8.

Inasmuch as section 2 and stud 8 are both heated during the welding, upon cooling, section 2 contracts and a shrink fit thereof to section 1 is obtained.

Following the welding, any surplus metal at the weld may be removed in any suitable manner to finish off the surface adjacent the weld, thus eliminating any protruding metal.

Figure 6:
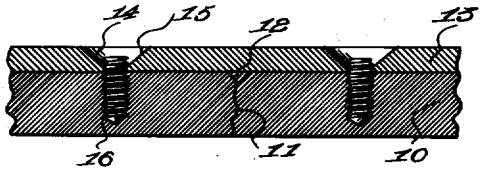
Figs. 6 and 7 are sectional views on the line 4—4 of Fig. 5 showing successive steps in the method of the modification shown in Fig. 5.
Figure 5:
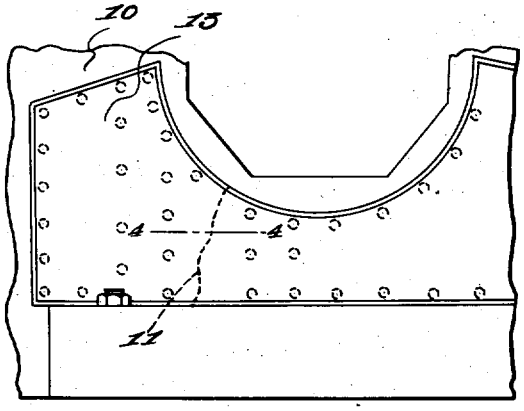
Fig. 5 is a fragmentary front elevation of a stationary engine showing a modification of the invention.
Figure 7:
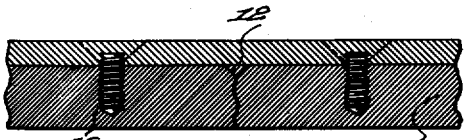
Figure 1:
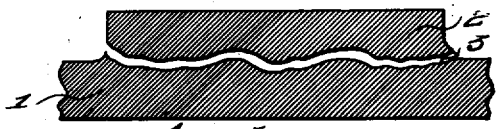
Figure 1 is a cross sectional view through a broken metallic structure.

Referring now to Figs. 5, 6, and 7, the numeral 10 designates a portion of a stationary engine which is cracked or fractured as shown at 11. It is impossible to remove one section from the other so I first seal the crack as shown at 12, preferably by removing metal adjacent the crack to form a V, and then welding the V. It is not always necessary to seal the crack, but it has been found advisable under many conditions.

I then obtain a plate 13 of suitable shape for the repair "job," and drill therethrough a plurality of openings 14 which are countersunk as shown at 15 in a manner similar to those heretofore described.

Next, I take plate 13 and temporarily position it against the surface 10 and drill openings in the surface 10 which are aligned with the openings 14; plate 13 serving as a template. It has been found that by providing a plate 13 formed of ductile weldable material, highly satisfactory results are obtained, but I do not limit myself to the use of a plate of this character as obviously a non-ductile plate may be employed within the spirit and scope of the invention.

Studs 16 are secured in the openings in the surface 10, said studs extending into the plate 13, as shown. The studs are then welded to the plate 13 as described heretofore and any surplus metal is removed from the welds to finish off the exterior surface. It will be apparent that the plate 13 bridges the crack or fracture 11 and any stresses or strains to which the repaired structure may be subjected are transmitted to the plate 13, the latter serving as the bridging element, by reason of its connection with the surface 10.

This invention has been practiced by electric welding for the reason that electric welding may be accurately controlled and a complete, nice, and durable repair effected.

From the above it is believed that the invention will be fully apparent to those skilled in the art, but I desire it understood that various changes in the form and proportions may be made within the scope of the appended claims without departing from the spirit of the invention.

What I claim as my invention and desire to secure by Letters Patent is:—

1. The method of joining metal plates or the like which comprises forming countersunk perforations in one of said plates, mechanically securing studs to the other plate, said studs being aligned with the aforesaid perforations, superposing the perforated plate on the other plate with the studs of the latter extended into the perforations, and then welding the studs to the superposed plate to fill the countersinks whereby to form a welded head on each of said studs.

2. The method of repairing cracked or broken structures which comprises securing studs in said structure, said structure providing the holding means for said studs, superposing a perforated plate on said structure to bridge the crack or break with the studs extending into the perforations, and finally welding said studs to said perforations.

3. The method of repairing cracked or broken structures which comprises securing studs in said structure, said structure providing the holding means for said studs, superposing a perforated plate on said structure to bridge the crack or break with the studs extending into the perforations, and finally filling said perforations with welding material to form a head on each of said studs to unite the superposed plate therewith.

4. The method of welding together sections of broken metallic structures which consists in forming countersunk perforations in one of the sections, forming tapped apertures in the other section, securing studs in said tapped apertures, superposing the perforated section on the other section with the studs positioned in said perforations, and finally electrically welding the portions of the studs within the perforations to said perforated section in the countersunk perforations to form a head at the end of each stud.

5. The method of repairing cracked metallic structures which consists in sealing the crack, forming a plurality of perforations in a plate, forming a plurality of recesses in the cracked structure which align with the perforations in said plate, securing studs directly to said cracked structure in the recesses therein, said recesses corresponding in size with said studs whereby the latter are aligned with each other and with the aforesaid perforatoins, superposing the plate on the cracked structure with the studs extending into the perforations, and finally welding the studs to said plate.

6. The method of repairing cracked metallic structures which consists in sealing the crack, forming a plurality of perforations in a plate, forming a plurality of recesses in the cracked structure which align with the perforations in said plate, securing studs directly to the cracked structure in the recesses therein, said recesses corresponding in size with the studs whereby the latter are aligned with each other and with the aforesaid perforations, superposing the plate on the cracked structure with the studs extending into the perforations, and finally electrically welding the studs to said plate.

7. The method of repairing cracked metallic structures which comprises sealing the crack, forming a plurality of perforations in a plate, forming a plurality of recesses in the cracked structure which align with the perforations in said plate, securing studs in the recesses in the cracked structure, said recesses being so formed as to align the studs with each other and with the aforesaid perforations, superposing the plate on the cracked structure with the studs extending into the perforations, and finally electrically welding the studs to said plate whereby to form a head on each of said studs.

8. A plate having a crack or break therein, ductile projecting members mechanically secured thereto on each side of said crack or break, and a substantially ductile plate welded to said projecting members and bridging said crack or break.

9. A plate having a crack or break therein, projecting members mechanically secured in said plate on each side of said crack or break, and a second plate arranged adjacent said first named plate and welded to said projecting members and bridging said crack or break to transmit strains to which said first named plate is subjected from the projecting members on one side of the crack or break to the projecting members on the other side of the crack or break.

10. The method of joining metal plates or the like which comprises forming perforations in one of said plates, securing projecting studs in the other plate, said plate providing the holding means for said studs whereby said studs are positively aligned with each other and with the perforations in the first mentioned plate, then superposing the perforated plate on said second named plate with the studs extending into the perforations therein, and finally welding the studs to the perforated plate to fill the countersinks and form a head on each of said studs.

ROYAL MATTICE.